US012566060B2

(12) United States Patent
Warashina

(10) Patent No.: US 12,566,060 B2
(45) Date of Patent: Mar. 3, 2026

(54) THREE-DIMENSIONAL MEASUREMENT DEVICE

(71) Applicant: FANUC CORPORATION, Yamanashi (JP)

(72) Inventor: Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 175 days.

(21) Appl. No.: 18/040,815

(22) PCT Filed: Aug. 31, 2021

(86) PCT No.: PCT/JP2021/031990
§ 371 (c)(1),
(2) Date: Feb. 7, 2023

(87) PCT Pub. No.: WO2022/050279
PCT Pub. Date: Mar. 10, 2022

(65) Prior Publication Data
US 2023/0296373 A1 Sep. 21, 2023

(30) Foreign Application Priority Data

Sep. 7, 2020 (JP) ................................. 2020-149865

(51) Int. Cl.
*G01B 11/24* (2006.01)
*G01B 11/25* (2006.01)

(52) U.S. Cl.
CPC .......... *G01B 11/24* (2013.01); *G01B 11/2518* (2013.01)

(58) Field of Classification Search
CPC ..... G01B 11/24; G01B 11/25; G01B 11/2518; G05B 2219/37053; G05B 2219/40621
See application file for complete search history.

(56) References Cited

U.S. PATENT DOCUMENTS

| | | | | | |
|---|---|---|---|---|---|
| 8,929,642 | B2 * | 1/2015 | Ichimaru | ............ | G01B 11/2518 356/309 |
| 2001/0046317 | A1 | 11/2001 | Kamon et al. | | |

(Continued)

FOREIGN PATENT DOCUMENTS

| | | | | |
|---|---|---|---|---|
| CN | 107607040 A | | 1/2018 | |
| CN | 109458928 A | * | 3/2019 | ........... G01B 11/002 |

(Continued)

OTHER PUBLICATIONS

Machine translation of CN-109458928-A (Year: 2019).*

*Primary Examiner* — Kara E. Geisel
*Assistant Examiner* — Jonathon Cook
(74) *Attorney, Agent, or Firm* — HAUPTMAN HAM, LLP

(57) ABSTRACT

This three-dimensional measurement device comprises: a projection unit that projects reference light to an object while performing scanning with the light; a light reception unit that receives the reference light reflected on the object; a time extent setting unit that sets a scanning time extent of the reference light in accordance with a distance-measuring range for each prescribed section of the light reception unit; and a three-dimensional information calculation unit that calculates three-dimensional information about the object W by means of triangulation based on information of the light reception unit within the set scanning time extent.

8 Claims, 12 Drawing Sheets

(56)     References Cited

U.S. PATENT DOCUMENTS

| | | | |
|---|---|---|---|
| 2016/0309140 | A1 | 10/2016 | Wang et al. |
| 2017/0353707 | A1 | 12/2017 | Wang et al. |

FOREIGN PATENT DOCUMENTS

| | | | | |
|---|---|---|---|---|
| JP | 863149507 | A | | 6/1988 |
| JP | H06229732 | A | | 8/1994 |
| JP | H7260444 | A | | 10/1995 |
| JP | H1133725 | A | | 2/1999 |
| JP | H11271030 | A | | 10/1999 |
| JP | 200088539 | A | | 3/2000 |
| JP | 2000088538 | A | | 3/2000 |
| JP | 2000-105108 | A | | 4/2000 |
| JP | 2000-275024 | A | | 10/2000 |
| JP | 2001-116528 | A | | 4/2001 |
| JP | 2001227923 | A | | 8/2001 |
| JP | 2002221408 | A | | 8/2002 |
| JP | 2002-296017 | A | | 10/2002 |
| JP | 2003329419 | A | | 11/2003 |
| JP | 2005-043084 | A | | 2/2005 |
| JP | 20069838 | A | * | 4/2006 |
| JP | 200698384 | A | * | 4/2006 |
| JP | 2006333493 | A | | 12/2006 |
| JP | 2012141964 | A | | 7/2012 |
| JP | 2012220473 | A | | 11/2012 |
| JP | 2013148353 | A | | 8/2013 |
| JP | 2013-200246 | A | | 10/2013 |
| JP | 20142744 | A | | 1/2014 |
| JP | 2016098384 | A | | 5/2016 |
| JP | 2018516395 | A | | 6/2018 |
| JP | 2020136958 | A | | 8/2020 |
| JP | 202132763 | A | | 3/2021 |
| KR | 1020120000234 | A | | 1/2012 |

* cited by examiner

Figure 6:
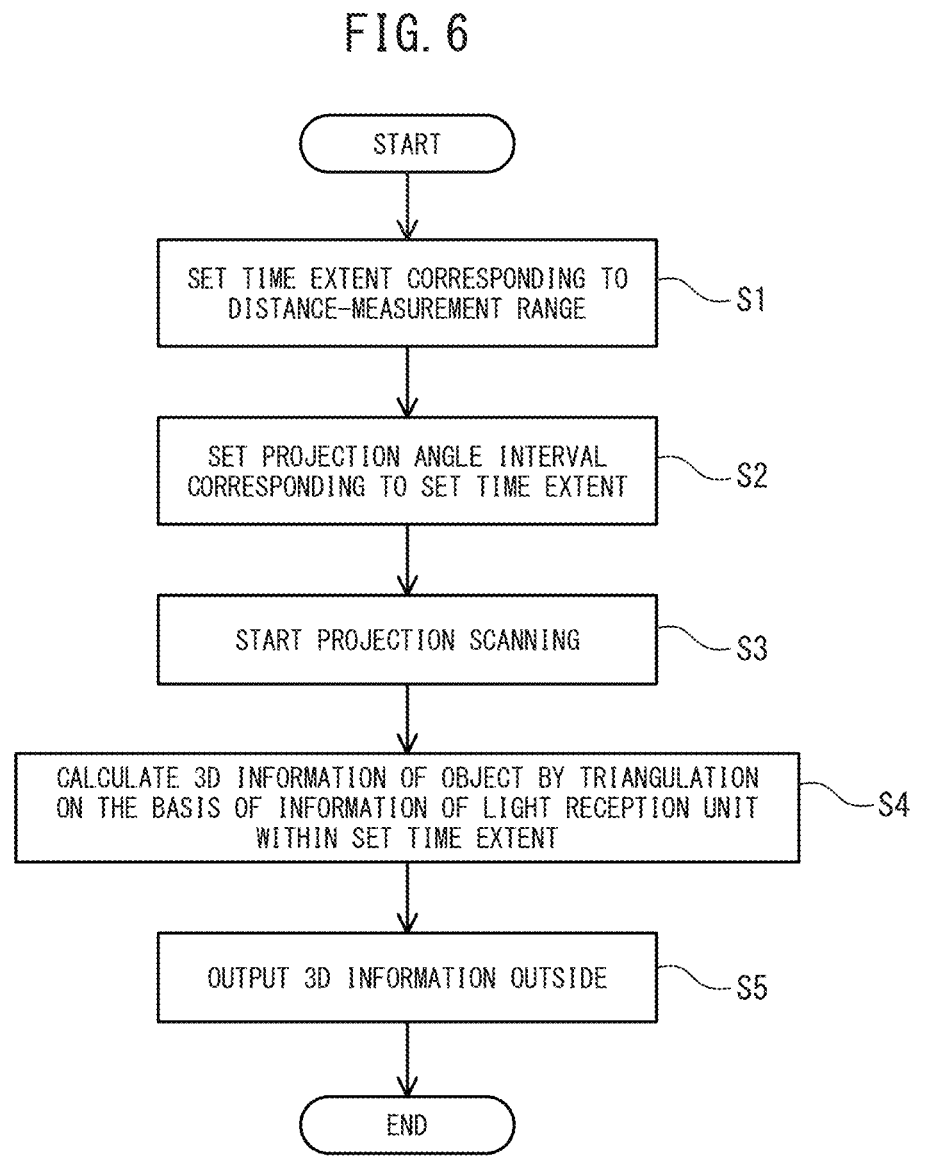

START

SET TIME EXTENT CORRESPONDING TO
DISTANCE-MEASUREMENT RANGE — S1

SET PROJECTION ANGLE INTERVAL
CORRESPONDING TO SET TIME EXTENT — S2

START PROJECTION SCANNING — S3

CALCULATE 3D INFORMATION OF OBJECT BY TRIANGULATION
ON THE BASIS OF INFORMATION OF LIGHT RECEPTION UNIT
WITHIN SET TIME EXTENT — S4

OUTPUT 3D INFORMATION OUTSIDE — S5

END

FIG. 8

THREE-DIMENSIONAL MEASUREMENT DEVICE

RELATED APPLICATIONS

The present application is a National Phase of International Application No. PCT/JP2021/031990 filed Aug. 31, 2021, which claims priority to Japanese Application No. 2020-149865, filed Sep. 7, 2020.

TECHNICAL FIELD

The present invention relates to a three-dimensional measurement device, and in particular, to an optical scanning three-dimensional measurement device.

BACKGROUND ART

As a distance measurement method based on triangulation using a structured light, a light projection method such as a light section method, a phase shift method, and a space encoding method has been proposed. In the light section method, while scanning an object, a band-shaped slit light is projected onto the object, the object is imaged from an imaging position different from a projection position, and the distance to the object is calculated by triangulation based on a projection angle of the slit light, an incident angle of the slit light onto the imaging surface and a baseline length between the light projection position and the imaging position. The projection angle of the slit light can be obtained, for example, from a command value to a scanner or a detection time of a bright line of the slit light appearing on the imaging surface, and the incident angle of the slit light can be obtained, for example, from the incident position of the slit light on the imaging surface. The light section method is said to be highly accurate, but compared to the phase shift method or the spatial code method, the number of images required for a single measurement is greater, and thus there is the problem that the measurement takes a long time.

In recent years, an event-based image sensor, based on a concept different from general frame-based image sensors, has been proposed. The frame-based image sensor outputs frame images at predetermined intervals by being exposed by opening/closing a shutter for a predetermined period of time. On the other hand, the event-based image sensor monitors each pixel independently and asynchronously from moment to moment, and then, when an event (for example, a change in luminance exceeding a predetermined level) is detected, the position, the time point, and the polarity (for example, whether it has become brighter (positive) or darker (negative)) of the pixel where the event occurred are output as event information. The event-based image sensor has a wider dynamic range than the frame-based image sensor, and is faster because it outputs only event information. Therefore, it is understood that the use of the event-based image sensor will contribute speeding up of the light section method.

Ideally, the events generated by the event-based image sensor should only be caused by the scanning of the slit light. However, only ideal events do not always occur when an actual scene is scanned, and a noise event may occur due to factors other than the scanning of the slit light. For example, distance measurement by the light section method is accompanied by a problem of multiple reflection of the slit light. Focusing on a certain pixel of the image sensor, it is originally intended to receive only the primary reflected light of the slit light irradiated toward a specific portion of the object imaged in that pixel. However, the primary reflected light of the slit light irradiated toward another portion of the object may be secondary-reflected at the specific portion and enter the pixel. When this phenomenon occurs, it cannot be determined whether the pixel receives the slit light directly reflected (single reflection) at the specific portion or the slit light multiple-reflected at the specific portion, making it difficult to measure the correct distance. Since the multiple reflected light has been reflected multiple times, it is weaker than the single reflected light unless the reflectance of any reflecting surface is 100%. Therefore, the frame-based image sensor usually uses luminance information to reduce the influence of multiple-reflected reference light, whereas the event-based image sensor does not output luminance information, so a similar method cannot be adopted. Further, the noise includes not only noise caused by the reference light multiple-reflected on the object, but also noise caused by the optical system and/or the image sensor (for example, flare, ghost, aberration, etc.). Techniques related to the present application are known, for example, in the following documents.

Patent Literature 1 discloses a three-dimensional input device, wherein images are synchronously captured by two image sensors while an object is scanned with slit light, frame numbers that the pixels of the respective image sensors detect the maximum brightness are stored, the pixels are associated based on the frame numbers, and a distance is calculated based on the associated pixels.

Patent Literature 2 discloses three-dimensional distance measurement based on a light section method, wherein, when the start of scanning and the start of counting the number of frames of the sensor are performed at the same time, a swing angle of the scanner is determined by knowing at which frame the slit light was detected, thereby the distance from the sensor to the object can be determined.

Patent Literature 3 discloses a shape measuring device which scans an object to be measured with a light beam, wherein a beam spot light reflected by a reference surface or a surface of the object is photoelectrically converted, and the surface shape of the object is determined based on the time difference between the rise timing of an electrical signal photoelectrically converted when the reference surface is scanned and the rise timing of an electrical signal photoelectrically converted when the object is scanned.

Patent Literature 4 discloses a three-dimensional image recognition device which irradiates a scanning light to an inspection area on an upper surface of a board while transporting the board, receives the scanning light reflected by the board and/or electronic components on the board, and determine the height of the electronic component based on the difference between the light receiving position on the light receiving surface when the light is reflected on the upper surface of the board and the light receiving position on the light receiving surface when the light is reflected on the upper surface of the electronic component, wherein the effects of multiple reflections and transmissive reflections are reduced by limiting the incident of the reflected light to the light receiving surface only to a translucent opening with a predetermined incident width.

Patent Literature 5 discloses a fillet welding sensing device which irradiates a slit light to a fillet weld part between members including a glossy member, wherein angles of a light source and a camera are determined such that an image of the slit light and an image of the secondary reflected light are separated.

Patent Literature 6 discloses a contour shape measuring device based on a light section method, wherein a depth of field is made extremely small, and images from two or more reflection points are not taken to the same extent as images from one reflection point so as to suppress erroneous measurements due to multiple reflections.

Patent Literature 7 discloses a distance measuring device using a pattern light projection method, wherein an object on which a line pattern in a direction substantially parallel to an epipolar line is projected is imaged, and multiple reflected light regions are detected based on the angular difference between the direction of the calculated line and the direction of the epipolar line.

Patent Literature 8 discloses an event-based image processing device, wherein it is detected as to whether a predetermined event has occurred in each of a plurality of pixels, an event signal is output in response to the detection, time stamp information is generated by mapping at least one pixel corresponding to the event signal and a time point when the event signal is output, and light currents are generated based on the time stamp information.

Patent Literature 9 discloses a method for three-dimensional reconstruction of a scene, wherein a first series of events for each pixel are received from a first sensor, a second series of events for each pixel are received from a second sensor, and a first event in the first series of events is matched to a second event in the second series of events according to the minimization of a cost function.

Patent Literature 10 discloses a three-dimensional measurement method and device for three-dimensionally measuring an object from each cross-sectional data for each predetermined pitch obtained by moving a slit light and a camera together along the length direction of the object, wherein a narrow window which intersects the slit light at right angles is set on an image sensor, and luminance data with the maximum luminance within the window and coordinate data in the Y-axis direction at that time are detected.

Patent Literature 11 describes a ROI (region of interest) corresponding to an object of interest is set based on a result of pattern recognition, and then by tracking the object of interest, it is possible to prevent an amount of event data from becoming enormous and a latency of event processing from becoming long.

Patent Literature 12 discloses a distance measurement system which measures a distance to an object using an event detection sensor and a structured light technology, and describes a method for synchronizing an image sensor with a structured light, in particular, for resetting the image sensor in synchronization with switching of a pattern light.

CITATION LIST

Patent Literature

[PTL 1] JP 2000-088539 A
[PTL 2] JP 2006-333493 A
[PTL 3] JP 2003-329419 A
[PTL 4] JP 2013-148353 A
[PTL 5] JP 1999(H11)-033275 A
[PTL 6] JP 2001-227923 A
[PTL 7] JP 2012-141964 A
[PTL 8] JP 2014-002744 A
[PTL 9] JP 2018-516395 A

[PTL 10] JP 1995(H07)-260444 A
[PTL 11] JP 2020-136958 A
[PTL 12] JP 2021-032763 A

SUMMARY OF INVENTION

Technical Problem

The purpose of the present invention is to reduce the influence of a noise such as multiple-reflected reference light beams when distance measurement is performed by optical scanning.

Solution to Problem

One aspect of the present disclosure provides a three-dimensional measurement device comprising: a projection unit configured to project a reference light to an object while scanning the object with the reference light; a light reception unit configured to receive the reference light reflected by the object; a time extent setting unit configured to set a scanning time extent of the reference light in accordance with a distance-measurement range for each predetermined section of the light reception unit; and a three-dimensional information calculation unit configured to calculate three-dimensional information of the object by means of triangulation on the basis of information of the light reception unit in the set scanning time extent.

Another aspect of the present disclosure provides a three-dimensional measurement device comprising: a projection unit configured to project a reference light to an object while scanning the object with the reference light; a light reception unit configured to receive the reference light reflected by the object, output only information in a region of interest, and move the region of interest corresponding to scanning of the reference light; and a three-dimensional information calculation unit configured to calculate three-dimensional information of the object by means of triangulation on the basis of information of the light reception unit in the region of interest.

Advantageous Effects of Invention

According to the one aspect of the present disclosure, since the reference light directly reflected at a specific portion of the object is always received within the scanning time extent of the reference light corresponding to the distance-measurement range, the influence of noise caused by multiple reflected reference light, etc., can be reduced by excluding the information of the light reception unit outside the set scanning time extent. Note that the distance-measurement range means a measurable range which is predetermined according to required specifications.

According to the other aspect of the present disclosure, the influence of noise caused by multiple reflected reference light, etc., can be reduced by excluding the information of the light reception unit outside the region of interest. In addition, since the light reception unit outputs the information in the region of interest only, the latency of the light reception unit due to excessive noise is lowered compared to the case where the information of the light reception unit is limited only by the scanning time extent of the reference light.

BRIEF DESCRIPTION OF DRAWINGS

FIG. 2 is a plan view of a light-section system showing a measurement principle of a light-section method.

FIG. 3 is a block diagram of a three-dimensional measurement device of a first embodiment.

FIG. 6 is a flowchart of the three-dimensional measurement device of the first embodiment.

FIG. 8 is a block diagram of a three-dimensional measurement device of a second embodiment.

DESCRIPTION OF EMBODIMENTS

Figure 1:
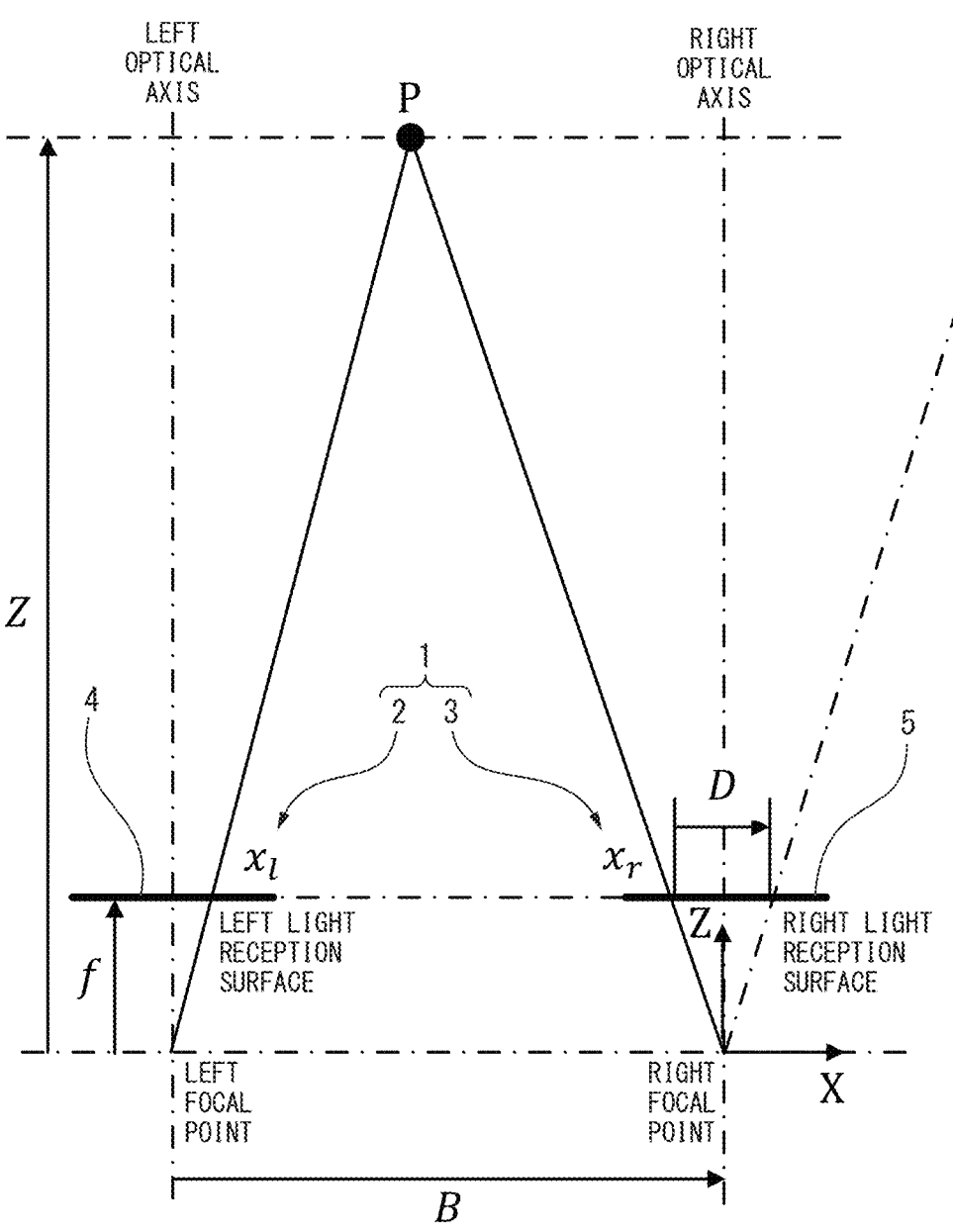
FIG. 1 is a plan view of a stereo camera showing a measurement principle of a stereo method.

The embodiments of the present disclosure will be described in detail below with reference to the attached drawings. In the drawings, identical or similar constituent elements have been assigned the same or similar reference signs. Further, the embodiments described below do not limit the technical scope of the invention described in the claims or the definitions of the terms.

A measurement principle of a three-dimensional measurement device of a present embodiment will be described. For easy understanding, measurement principles of a stereo method and a light section method will be described first. FIG. 1 is a plan view of a stereo camera 1 showing the measurement principle of the stereo method. The stereo camera 1 has a left light reception unit 2 and a right light reception unit 3 corresponding to two cameras, for example. For example, the left and right light reception units 2 and 3 are arranged so as to be equi-parallel to each other. That is, both of the light reception units are separated by a base line length B, optical axes of the light reception units are arranged in parallel, a left light reception surface 4 and a right light reception surface 5 are arranged in a plane orthogonal to both optical axes, so that the x- and y-directions of each light reception surface are oriented in the same direction. Each light reception surface is, for example, an image sensor in which a plurality of pixels are arranged two-dimensionally, but may be a line sensor, etc., in which a plurality of pixels are arranged one-dimensionally (for example, arranged only in the x-direction).

In this regard, assuming that a position of a pixel on the left light reception surface 4, on which an image of a point P of an object existing in an object space is projected, is determined as $x_l$, and a position of a pixel on the right light reception surface 5, on which the image of the point P of the object is projected, is determined as $x_r$, a disparity D between the left and right light reception units 2 and 3 is $(x_l - x_r)$ $(D = x_l - x_r)$. Assuming that the origin of the XYZ coordinate system representing the three-dimensional space is placed at a right focal point, a focal length of each light reception unit is f, and a pitch between pixels in each of the light reception surfaces is 1, a distance Z to the point P of the object (a depth to the point P (hereinafter, same as above)) is obtained from the following equation.

[Math 1]

$$Z = \frac{Bf}{D} \qquad 1$$

The base line length B and the focal length f are constants determined by the design of the stereo camera 1. Therefore, if the image of the point P on the right light reception surface 5 corresponding to the image of the point P on the left light reception surface 4 can be detected by image processing such as pattern matching, the disparity D can be obtained, and then the distance Z to the point P of the object can be obtained.

Figure 2:
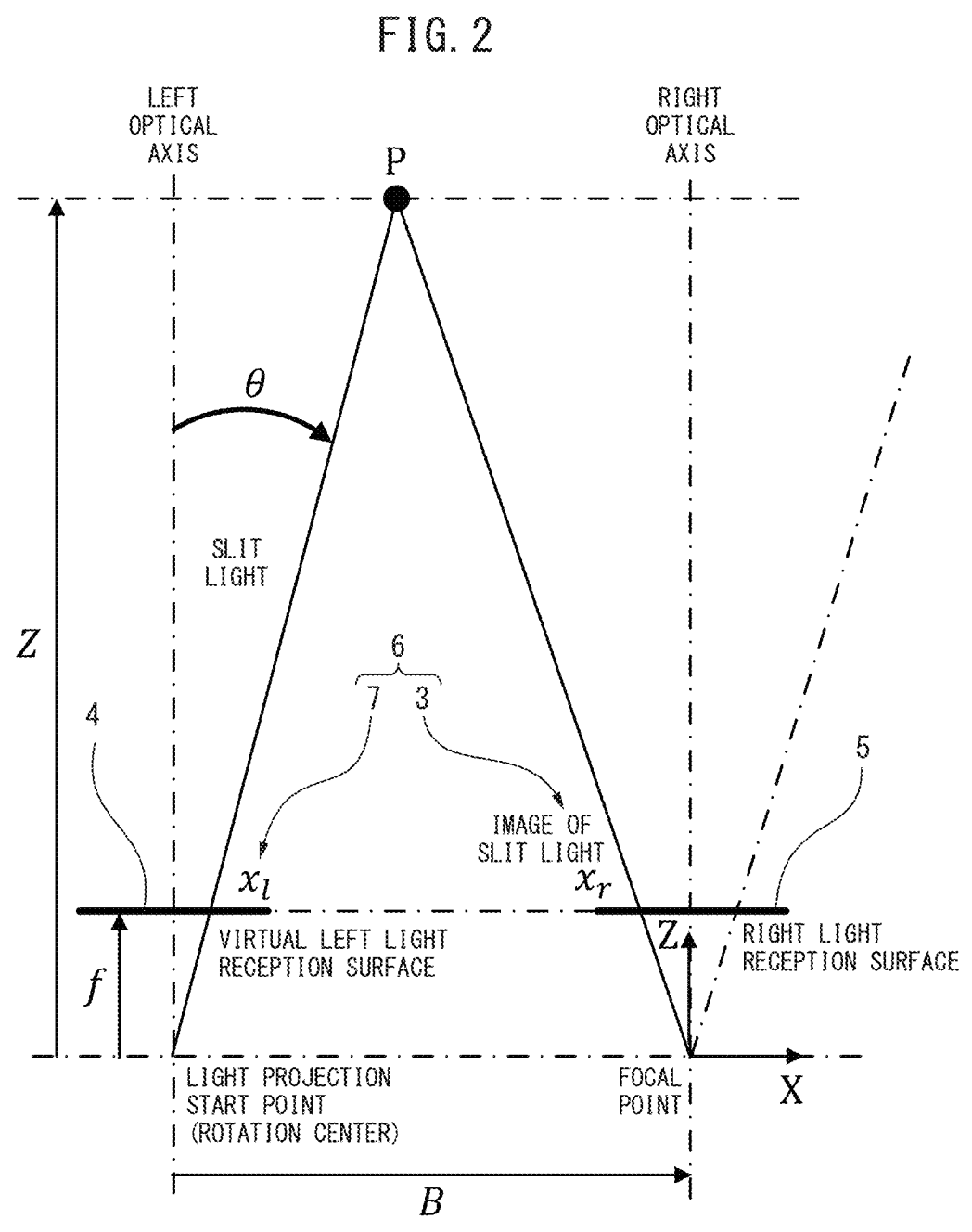

The light section system is obtained by replacing the left light reception unit 2 of the stereo camera 1 with a light projection unit, for example. FIG. 2 is a plan view of the light section system 6 showing the measurement principle of the light section method. The light section system 6 includes a light projection unit 7 corresponding to, for example, a projector. The light projection unit 7 projects a band-shaped slit light onto the object while scanning it, and the right light reception unit 3 receives the slit light reflected by the object. Herein, assuming that the light projection start point (or a rotation center) is positioned at the left focal point of the stereo camera 1, and a projection angle from the left optical axis of the stereo camera 1 is θ, The pixel position $x_l$ of the virtual left light reception surface 4 of the light projection unit 7 is obtained by the following equation.

[Math 2]

$$x_l = f \tan \theta \qquad 2$$

Also, assuming that the light projection unit 7 irradiates the band-shaped slit light from the light projection start point while rotating about the Y-axis perpendicular to the XZ plane at a constant angular speed ω, and the slit light passes through the left optical axis at a time point $t_0$, and the slit light is projected on the point P of the object at the projection angle θ at time point t, the projection angle θ can be obtained by the following equation.

[Math 3]

$$\theta = \omega(t - t_0) \qquad 3$$

Therefore, assuming that the reflected light at the point P of the slit light is received at the position $x_r$ of the pixel on the right light reception surface 5, the distance Z to the point P of the object can be obtained by substituting equations 2 and 3 into equation 1 as shown in the following equation.

[Math 4]

$$Z = \frac{Bf}{D} = \frac{Bf}{f\tan(\omega(t - t_0)) - x_r} \qquad 4$$

The base line length B, the focal length f, the angular speed w, and the time point $t_0$ are constants determined by the design of the light section system 6. Therefore, the distance Z to the point P of the object can be obtained by determining the time point t when the slit light is detected at the position $x_r$ of the pixel on the right light reception surface 5.

The three-dimensional measurement device of the embodiment utilizes such a configuration and measurement principle of the light section method. However, it should be noted that the above configuration and measurement principle are examples, and that the design can be changed as appropriate according to the design of the system configuration and layout, etc. For example, the light projection unit 7 and the right light reception unit 3 may not be arranged equi-parallel to each other. Further, instead of replacing the left light reception unit 2 with the light projection unit 7, light projection unit 7 may be prepared in addition to the left and right light reception units 2 and 3 so as to employ a system configuration combining the stereo method and the light section method. Further, the light projection unit 7 may be employed which projects beam-shaped spot light or block check-shaped pattern light onto the object, instead of the band-shaped slit light. It should be noted that the calculation method of the three-dimensional information also varies according to such design changes.

Figure 3:
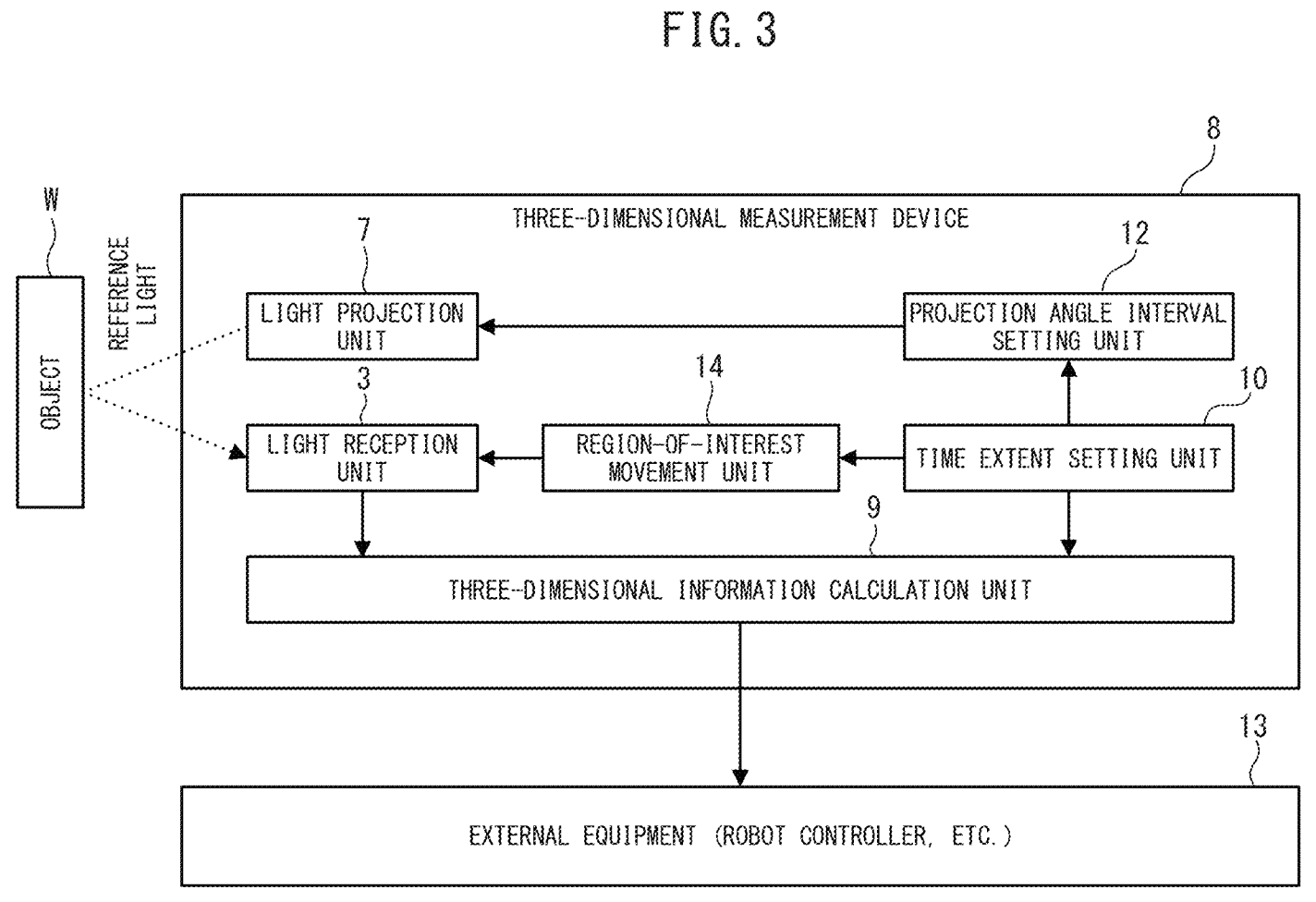

Hereinafter, the configuration of a three-dimensional measurement device of a first embodiment will be explained. FIG. 3 is a block diagram of a three-dimensional measurement device 8 of the first embodiment. The three-dimensional measurement device 8 includes a light projection unit 7 configured to project a reference light to an object W while scanning the object W with the reference light, and a light reception unit 3 configured to receive the reference light reflected by the object W. For example, the projection unit 7 corresponds to a projector, and the light reception unit 3 corresponds to a camera. Assume that the times of the projection unit 7 and the light reception unit 3 are synchronized.

The light projection unit 7 projects a reference light such as a slit light, a spot light, and a pattern light onto the object W, for example. The light projection unit 7 may project a plurality of reference lights while maintaining a predetermined projection angle interval. Since the measurement time of the three-dimensional measuring device 8 is determined by the time it takes to scan the object W with the reference light, it is usual to increase the scanning speed in order to shorten the measurement time. However, in such a case, the response speed of the light reception unit 3 becomes a constraint. Therefore, by projecting a plurality of reference lights, it is possible to shorten the measurement time while maintaining the scanning speed under the constraint of the response speed of the light reception unit 3.

The light reception unit 3 has, for example, an image sensor in which a plurality of pixels are arranged two-dimensionally, but may have a line sensor in which a plurality of pixels are arranged one-dimensionally. The image sensor of the light reception unit 3 is, for example, an event-based sensor. In the case of an event-based image sensor, the light reception unit 3 monitors each pixel independently and asynchronously from moment to moment.

When the light reception unit 3 detects a predetermined or more event (e.g., a luminance change of a predetermined level or more), the light reception unit 3 outputs event information including a position, a time point and a polarity (e.g., the pixel gets brighter or darker) of the pixel where the event occurred, and so on. Alternatively, the image sensor of the light reception unit 3 may be a conventional frame-based image sensor. In the case of a frame-based image sensor, the light reception unit 3 opens and closes a shutter for a predetermined period of time for exposure, thereby frame images are output at predetermined time intervals. The frame images include, for example, frame numbers, and brightness information of each pixel, etc.

The three-dimensional measuring device 8 also includes a three-dimensional information calculation unit 9 configured to calculate three-dimensional information of the object W by triangulation on the basis of information from the light reception unit 3. When the sensor of the light reception unit 3 is an event-based sensor, the pixel detecting an event (e.g., a luminance change of a predetermined level or more) occurred on a pixel indicates that the reflected light is received on that pixel, and thus the distance measurement is performed based on the event information (e.g., the position, the time and the polarity of the pixel where the luminance changed). Since the slit width of the slit light and the spot diameter of the spot light may correspond to the size of multiple pixels, the distance measurement may be performed by determining the intermediate time point between when the pixel starts to brighten and when it ends dark. On the other hand, when the sensor of the light reception unit 3 is a frame-based sensor, the three-dimensional information calculation unit 9 detects the position and frame number (corresponding to the time point) with the maximum luminance for each pixel among the plurality of frame images output from the light reception unit 3, and performs the distance measurement based on this detection information.

In order to reduce the influence of noise caused by multiple reflections, etc., of the reference light, the three-dimensional measurement device 8 further has a time extent setting unit 10 configured to set a scanning time extent of the reference light in accordance with a distance-measurement range for each predetermined section of (the plurality of pixels constituting the light reception surface of) the light reception unit 3. The three-dimensional information calculation unit 9 excludes the information of the light reception unit 3 outside the set scanning time extent, and performs the distance measurement based on the information of the light reception unit 3 within the set scanning time range, thereby erroneous distance measurement due to noise caused by multiple-reflected reference light, etc., is limited.

Figure 4A:
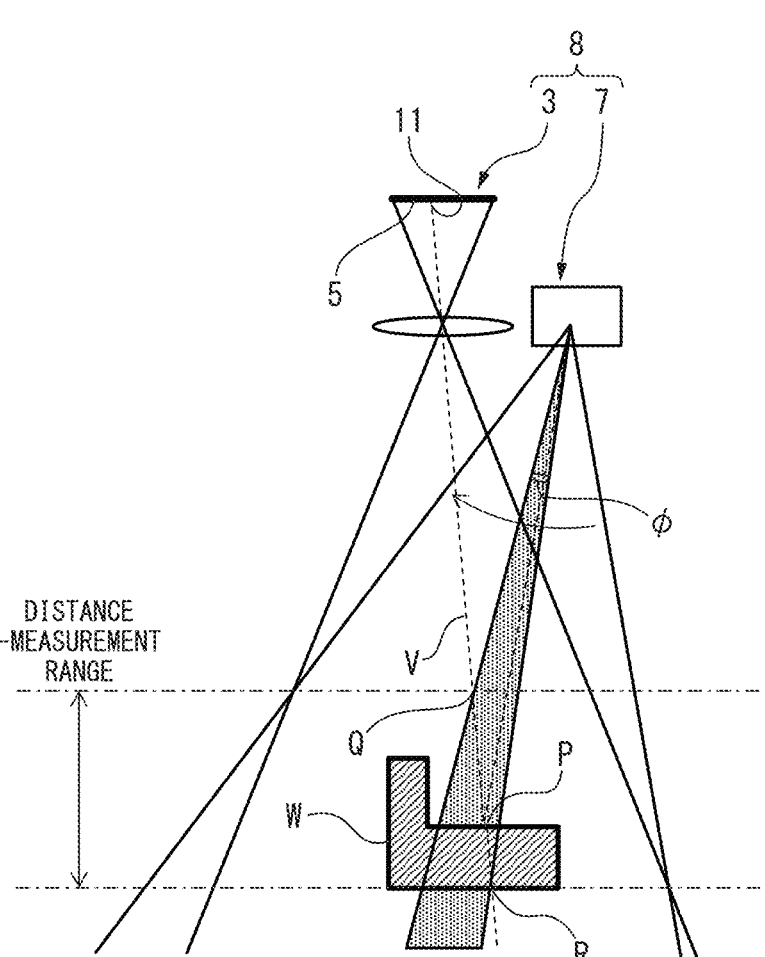
FIG. 4A is a plan view of the three-dimensional measurement device showing a method for setting a scanning time extent.

A method for setting this scanning time extent will be described in detail. FIG. 4A is a plan view of the three-dimensional measurement device 8 showing a method for setting the scanning time extent. The distance-measurement range in the drawing is a distance-measurable range which is predetermined according to required specifications. For example, when the depth of field of the three-dimensional measurement device 8 is designed so that the distance from 1000 mm to 2000 mm can be measured, the distance-measurement range will be from 1000 mm to 2000 mm. Since the light which enters the pixel 11 of the light reception unit 3 is always incident through a line of vision (view line) V, the incident light is always received within the scanning time extent where the reference light scans an intersection line segment QR of the view line V and the distance-measurement range, as long as the incident light is single reflected light of the reference light, and as long as the single reflected point P of the object W is within the distance-measurement range. Therefore, it is preferable to set the scanning time extent by geometrically calculating the scanning time extent in which the reference light scans the intersection line segment QR of the view line V of the pixel 11 and the distance-measurement range.

Alternatively, in case that the distance-measurement range is from 1000 mm to 2000 mm, for example, the slit light may be scanned to record the time point when the image of the slit light passes through each pixel while a flat plate is placed at a distance of 1000 mm, further, the slit light may be scanned to record the time point when the image of the slit light passes through each pixel while the flat plate is placed at a distance of 2000 mm, and then the obtained two time points may be determined as the maximum and minimum values of the scanning time extent. Since measurement variations may also occur, in practice, it is preferable to set the scanning time extent by taking an average of multiple measurements or adding some margin. By performing distance measurement based on the information of the light reception unit 3 in the scanning time extent which is set in this way, it becomes possible to suppress erroneous distance measurement due to noise caused by the multiple-reflected reference light, etc.

Figure 4B:
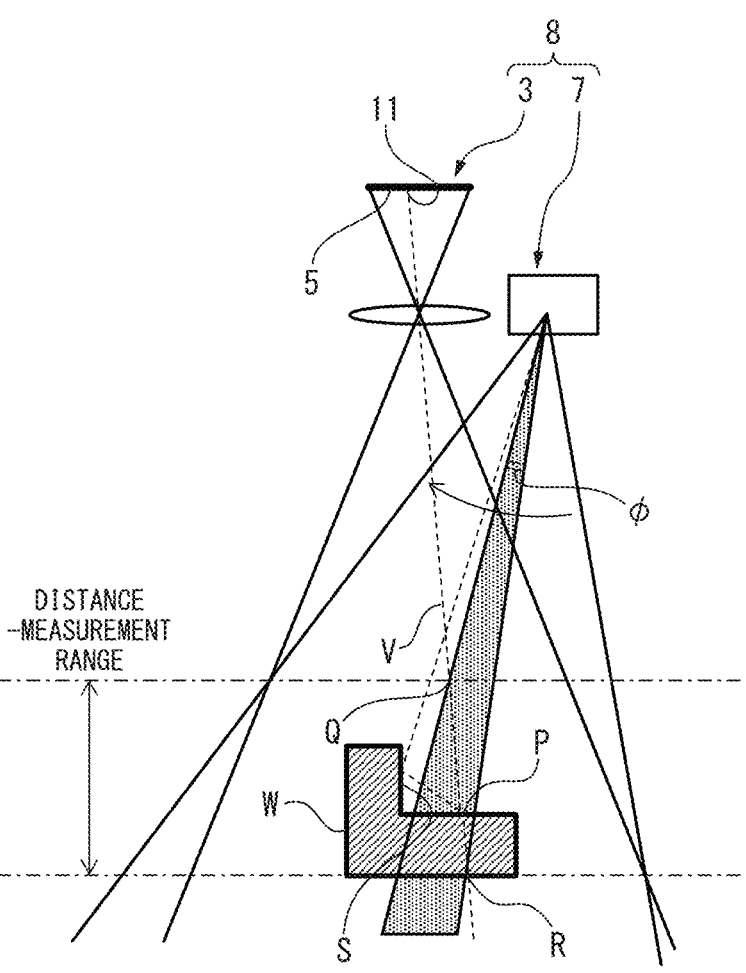
FIG. 4B is a plan view of the three-dimensional measurement device showing how an influence of noise such as multiple-reflected reference light is reduced.

FIG. 4B is a plan view of the three-dimensional measurement device 8 showing how the influence of the multiple-reflected reference light is reduced. When the reference light primarily reflected by a certain surface S of the object W is secondarily reflected by the point P of the object W and is incident on the pixel 11, the possibility that the reference light is incident on the pixel 11 outside the set scanning time extent becomes higher. Therefore, by performing the distance measurement while excluding the information of the light reception unit 3 outside the set scanning time extent, it is possible to suppress erroneous distance measurement due to the multiple-reflected reference light.

Figures 5A, 5B:
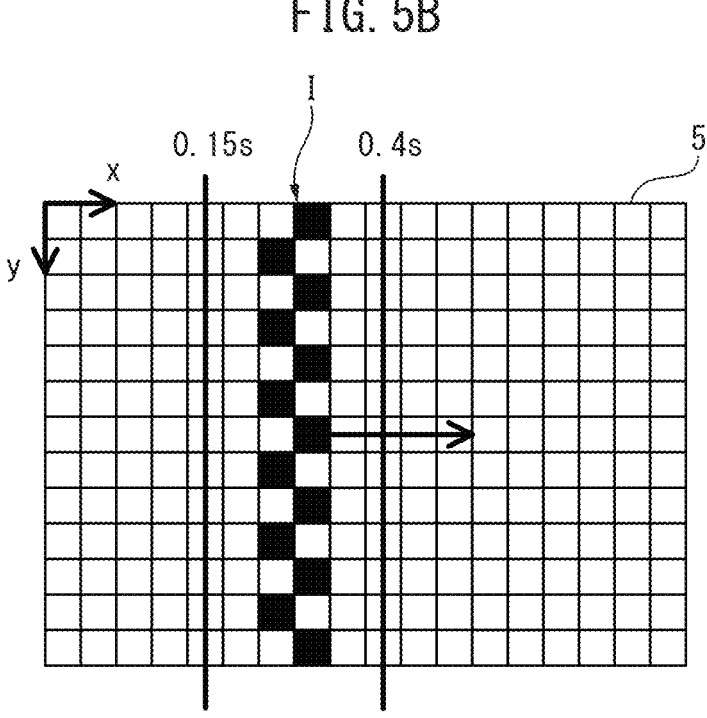
FIG. 5A is a plan view of a light reception surface showing an example of setting sections of the scanning time extent.
FIG. 5B is a plan view of a light reception surface showing an example of setting sections of the scanning time extent.
Figure 5C:
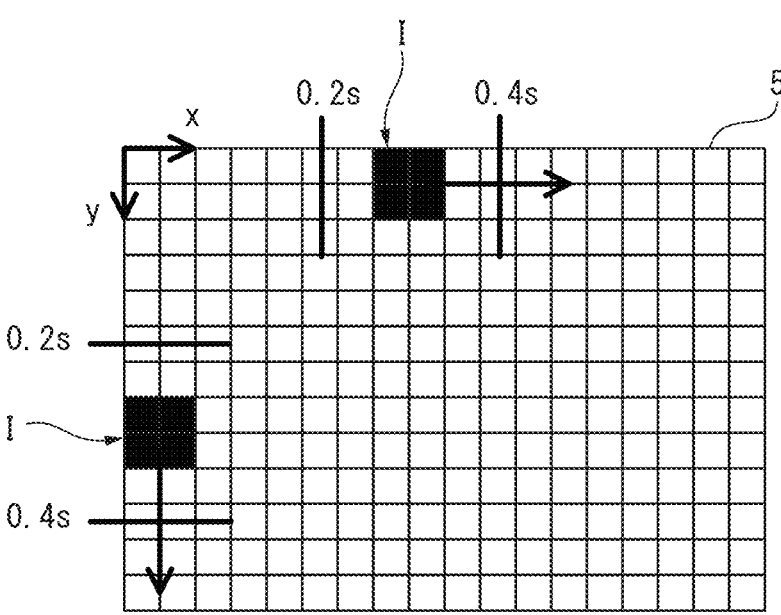
FIG. 5C is a plan view of a light reception surface showing an example of setting sections of the scanning time extent.

This scanning time extent may be set for each pixel, wherein one pixel among the plurality of pixels constituting the light reception unit 3 is set as one section. However, for the purpose of saving a setting memory and shortening a measurement time, the scanning time extent may be set for each section, by collecting a group of neighboring pixels among the plurality of pixels constituting the light reception unit 3 as one section. FIGS. 5A to 5C are plan views of the light reception surface 5 showing examples of setting sections of the scanning time extent. Assuming that assembly errors and lens distortion of the three-dimensional measurement device 8 can be ignored, when the reference light is a slit light such that an image I of the slit light is formed parallel to the y-axis of the light reception surface 5 when scanning a flat surface in the direction as shown in FIG. 5A, the scanning time extent (e.g., 0.2 s to 0.4 s) may be set by collecting the group of pixels in one or more rows which simultaneously capture the image I of the slit light as one section. Also, when the reference light is a block-check pattern light such that an image I of the pattern light is formed parallel to the y-axis of the light reception surface 5 when scanning a flat plate in the x-direction as shown in FIG. 5B, the scanning time extent (e.g., 0.15 s to 0.4 s) may be set by collecting the group of pixels in two or more rows which simultaneously capture the image I of the pattern light as one section.

Furthermore, when the reference light is a spot light such that an image I of the spot light is formed on a group of four neighboring pixels on the light reception surface 5 when scanning a flat plate in the x- and y-directions as shown in FIG. 5C, the scanning time extent (e.g., 0.2 s to 0.4 s) may be set by collecting the group of four neighboring pixels which simultaneously capture the image I of the spot light as one section. The scanning time extent which is set in this way may be the time range which has passed since the start of scanning in the case of the event-based image sensor, whereas the scanning time extent may also be the frame number range which has passed since the scanning start in the case of the frame-based image sensor.

Referring to FIG. 3 again, when the light projection unit 7 projects the plurality of slit lights, the three-dimensional measurement device 8 may include a projection angle interval setting unit 12 configured to set the projection angle interval according to the set scanning time extent. The projection angle interval is set to an angle interval wider than the scanning angle φ at which the slit light scans in the set scanning time extent, as exemplified in FIGS. 4A and 4B. When the plurality of slit lights are projected while maintaining the projection angle interval narrower than the scanning angle φ, a method for identifying which slit light has been received is required, since each pixel in the section for which the scanning time extent of the scanning angle φ is set receives the plurality of slit lights within that scanning time extent. However, by setting the projection angle interval of the plurality of slit lights to be wider than the scanning angle φ, each pixel in this section receives only one slit light within the scanning time extent, and thus it is not necessary to identify the slit light. When projecting a plurality of block-check pattern lights as shown in FIG. 5B, the projection angle interval may be set similarly.

Moreover, regardless of whether the light reception unit 3 has the event-based image sensor or the frame-based image sensor, the image sensor of the light reception unit 3 preferably has a function of outputting only information in a region of interest. In this regard, the region of interest may be a well-known region of interest (ROI). However, it should be noted that "region of interest" as used herein is not necessarily limited to a general ROI. For example, in the case of the frame-based image sensor, only a captured image within the region of interest is output, and in the case of the event-based image sensor, only event information occurring in the region of interest is output. When the light reception unit 3 has a function of outputting only information in the region of interest, the three-dimensional measurement device 8 preferably has a region-of-interest movement unit 14 configured to move the region of interest in accordance with the scanning of the reference light. The light reception unit 3 moves the region of interest based on an input signal (e.g., a movement command) from the region-of-interest movement unit 14. For example, the region of interest moves over time so as to include a section (pixels or a group of pixels) for which the scanning time extent including a certain time point t during measurement is set. This section (pixels or pixel groups) for which the scanning time extent is set does not need to match the region of interest completely. This ensures that the region of interest does not miss the occurrence of the event or the output of the maximum luminance. With such a region of interest, it is possible to limit the pixels in which the event occurs or the pixels which output the maximum luminance, so that the amount of data output from the light reception unit 3 can be reduced. After that, the three-dimensional information calculation unit 9 performs the distance measurement based on the event information limited in the region of interest, or performs the distance measurement by detecting the position and frame number with the maximum brightness of each pixel in the limited region of interest. Therefore, the measurement time can be greatly shortened. In addition, since noise caused by the multiple-reflected reference light, etc., is also limited by the region of interest, erroneous distance measurement due to the noise can be suppressed.

Referring to FIG. 3 again, the three-dimensional information calculated by the three-dimensional information calculation unit 9 is output to the outside of the three-dimensional measurement device 8. The three-dimensional information is used, for example, by external equipment 13 such as a robot controller, a vehicle controller, etc., in addition to a so-called image processing device. The external equipment 13 can perform image processing based on three-dimensional information in which the influence of noise caused by multiple-reflected reference light, etc., is reduced, and can perform, for example, position control, speed control, acceleration control, etc.

The three-dimensional information calculation unit 9, the time extent setting unit 10, the projection angle interval setting unit 12 and the region-of-interest movement unit 14 as described above may be implemented as an integrated circuit such as an ASIC (application specific integrated circuit) and an FPGA (field-programmable gate array), or may be implemented as a program executed by a processor such as a CPU (central processing unit) and an MPU (micro processing unit).

Hereinafter, an operation of the three-dimensional measurement device 8 will be described. FIG. 6 is a flowchart showing the operation of the three-dimensional measurement device 8. In step S1, the time extent setting unit 10 sets the scanning time extent of the reference light corresponding to the distance-measurement range for each predetermined section among the plurality of pixels constituting the light reception unit 3. At this time, when the scanning time extent of the reference light should be geometrically calculated, the user may input the distance-measurement range via a user interface unit (not shown) such as a touch panel display or a keyboard. Alternatively, a distance-measurement range previously stored in memory may be used. When a plurality of reference lights should be projected, the projection angle interval is set according to the scanning time extent which is set by the projection angle interval setting unit 12 in step S2.

When the projection and scanning of the reference light are started in step S3, the three-dimensional information calculation unit 9 calculates the three-dimensional information of the object by triangulation on the basis of the information of the light reception unit 3 in the set scanning time extent in step S4. When the image sensor of the light reception unit 3 is the event-based image sensor, the three-dimensional information of the object is calculated based on the position, the time point and the polarity of the pixel where the event occurred within the set scanning time extent. When the image sensor of the light reception unit 3 is the frame-based image sensor, the position and the frame number with the maximum brightness of each pixel are detected from the plurality of frame images within the set frame number range, and the three-dimensional information of the object is calculated based on the position and the frame number of the pixel. When the three-dimensional information is output to the outside in step S5, the process terminates.

In this flowchart, steps S1 to S5 are described as a series of processes, whereas steps S1 and S2 may be performed when the three-dimensional measurement device is installed or calibrated, etc., and steps S3 to S5 may be performed during measurement. Also, it should be noted that steps S2 and S5 are not necessarily essential steps.

According to the three-dimensional measurement device 8 of the first embodiment, the reference light which is directly reflected by the specific portion of the object W is always received within the scanning time extent corresponding to the distance-measurement range. Therefore, the influence of noise such as multiple-reflected reference light can be reduced by performing distance measurement while excluding the information of the light reception unit 3 outside the set scanning time extent.

Figure 7A:
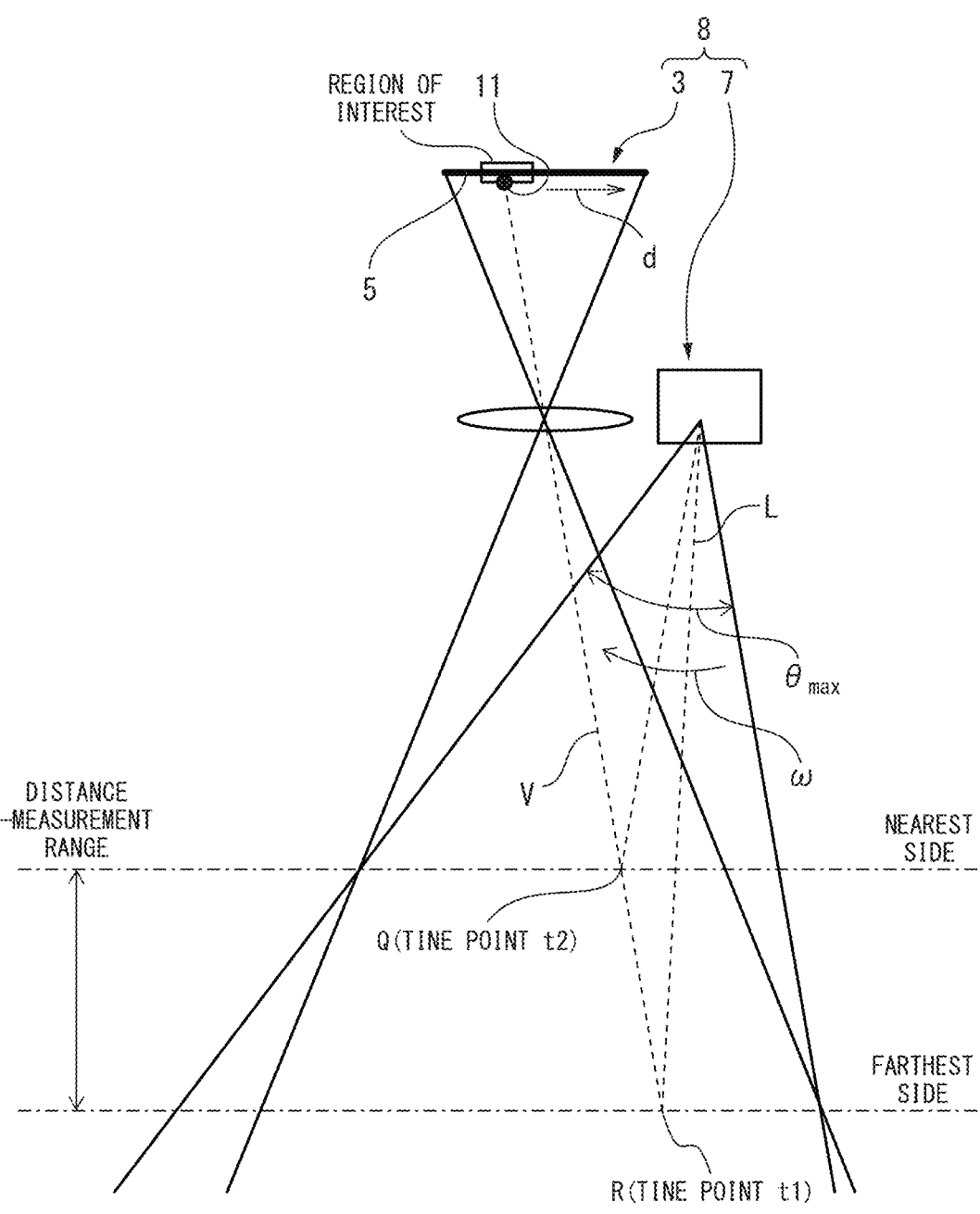
FIG. 7A a plan view of the three-dimensional measurement device showing a region of interest of a first embodiment.
Figure 7B:
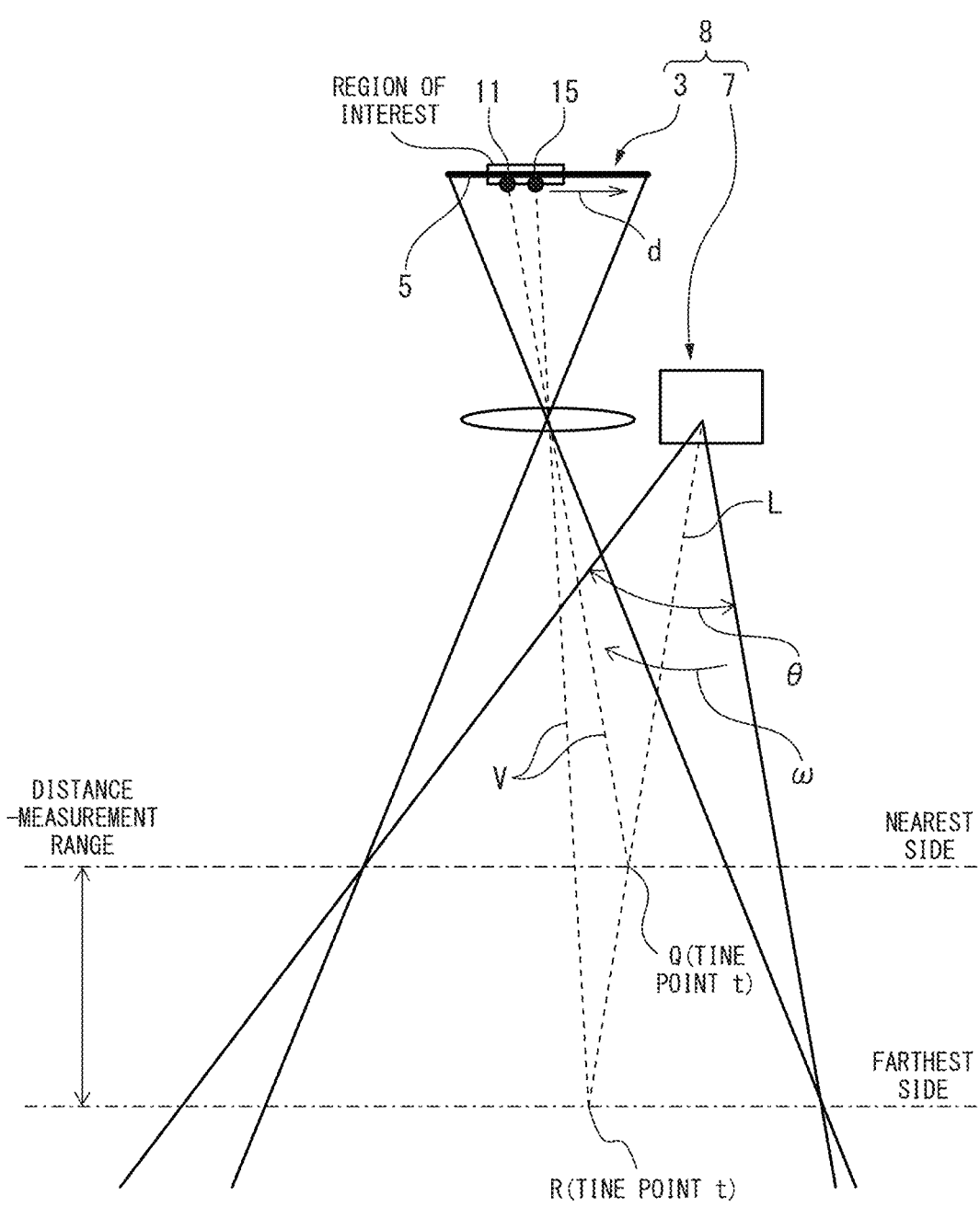
FIG. 7B a plan view of the three-dimensional measurement device showing a region of interest of a second embodiment.

Hereinafter, a three-dimensional measurement device 8 according to a second embodiment will be described. Note that the description of the same configuration and operation as those of the three-dimensional measurement device 8 of the first embodiment will be omitted. FIG. 7A is a plan view of the three-dimensional measurement device 8 showing the region of interest of the first embodiment, and FIG. 7B is a plan view of the three-dimensional measurement device 8 showing the region of interest of the second embodiment. In the three-dimensional measurement device 8 of either the first embodiment or the second embodiment, while the reference light L scans the projection angle range θmax of the entire distance-measurement range at the scanning speed ω, the region of interest moves in the moving direction d in response to (or by following) the scanning of the reference light L. However, the three-dimensional measurement devices 8 of the first embodiment and the second embodiment are different in the following points.

As shown in FIG. 7A, in the three-dimensional measurement device 8 of the first embodiment, one pixel 11 is focused on, and it is assumed that the time of the reference light L forming the image on the pixel 11 should be within the scanning time extent of the reference light L between a time point t1 when the light is irradiated onto a point R on the farthest side of the distance-measurement range and a time point t2 when the light is irradiated onto a point Q on the nearest side of the distance-measurement range (i.e., the scanning time extent corresponding to the distance-measurement range of the reference light L). Under this assumption, the region of interest moves over time so as to include the section for which the scanning time extent including a certain time during measurement is set.

In contrast, as shown in FIG. 7B, in the three-dimensional measurement device 8 of the second embodiment, one time point t is focused on, and it is assumed that the image of the reference light L irradiated at the certain time point t during measurement should be within an imaging range between an imaging point (e.g., the pixel 11) when the reference light is reflected at a point Q on the nearest side of the distance-measurement range and an imaging point (e.g., the pixel 15) when the reference light is reflected at a point R on the farthest side of the distance-measurement range (i.e., the imaging range of the reference light L according to the distance-measurement range. Under this assumption, the region of interest moves over time so as to include the imaging range of the reference light L corresponding to the distance-measurement range at the certain time point t during measurement (e.g., the group of pixels from the pixel 11 to the pixel 15).

Figure 8:
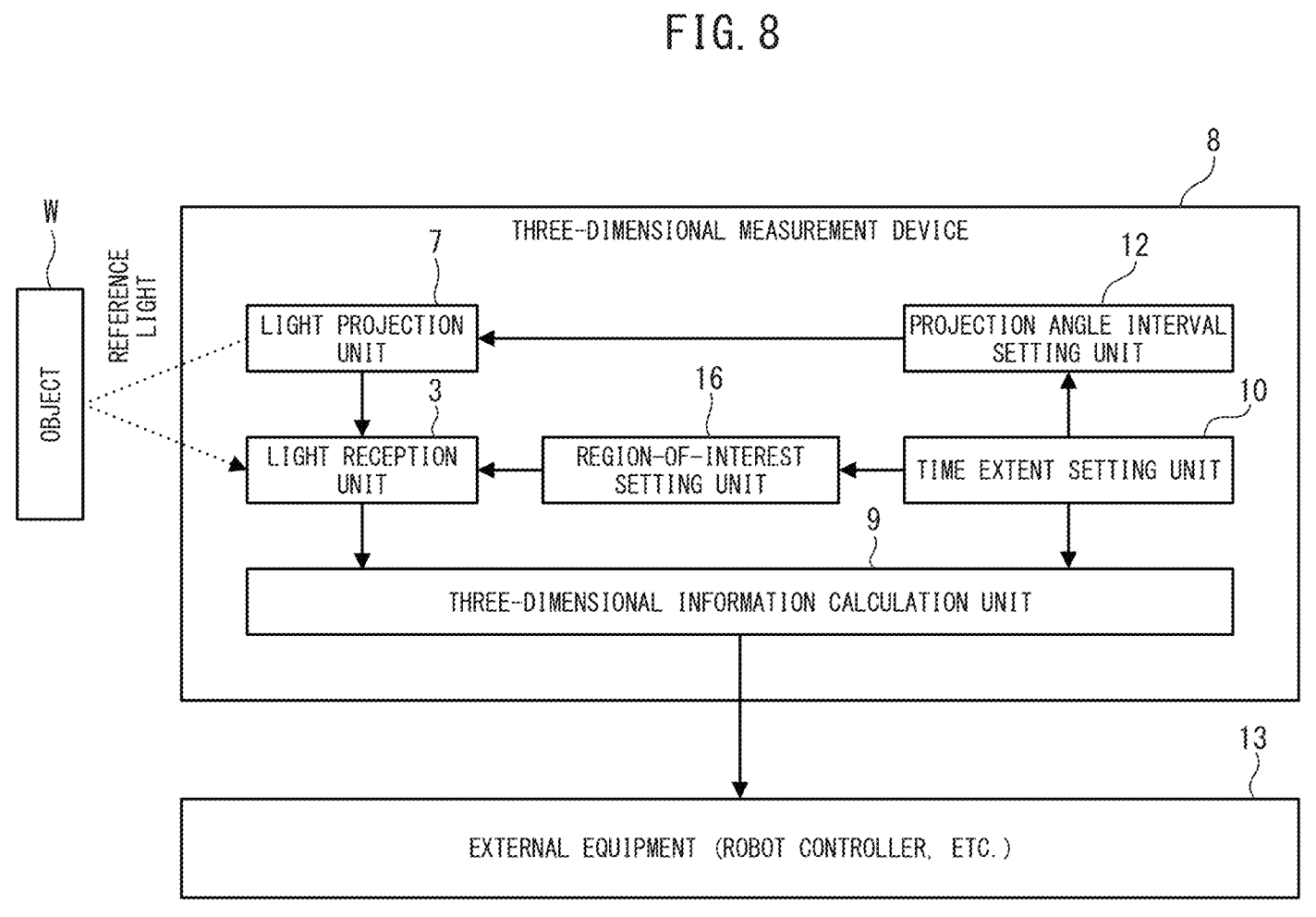

FIG. 8 is a block diagram of the three-dimensional measurement device 8 of the second embodiment. In the three-dimensional measurement device 8 of both the first and second embodiments, the region of interest moves in synchronization with the scanning of the reference light. In this regard, in the first embodiment, the region-of-interest movement unit 14 transmits a movement command for moving the region of interest to the light reception unit 3 so that the region of interest includes the section (for example, the pixel 11 or a group of pixels near the pixel 11) for which the scanning time extent of the reference light L corresponding to the distance-measurement range is set. On the other hand, in the second embodiment, the three-dimensional measurement device 8 includes a region-of-interest setting unit 16 configured to previously set the region of interest, and the region-of-interest setting unit 16 sets the region of interest so as to include the imaging range of the reference light corresponding to the distance-measurement range at the certain time point t during measurement, and the light reception unit 3 itself moves the set region of interest based on an input signal (e.g., a trigger signal) from the light projection unit 7. The region-of-interest setting unit 16 sets at least one of an initial position, a size (a width and a height), a moving direction and a moving speed of the region of interest, and then the light reception unit 3 locates the region of interest having the set size at the initial position and moves the located region of interest from the initial position in a predetermined direction at a predetermined speed (e.g., at a constant speed). The light reception unit 3 preferably inputs the input signal (e.g., the trigger signal) when the projection angle of the reference light L reaches a predetermined angle, and moves the region of interest. When moving the region of interest, the light reception unit 3 preferably moves the region of interest in synchronization with a clock signal of the image sensor (or the light reception surface 5).

Figures 9A, 9B:
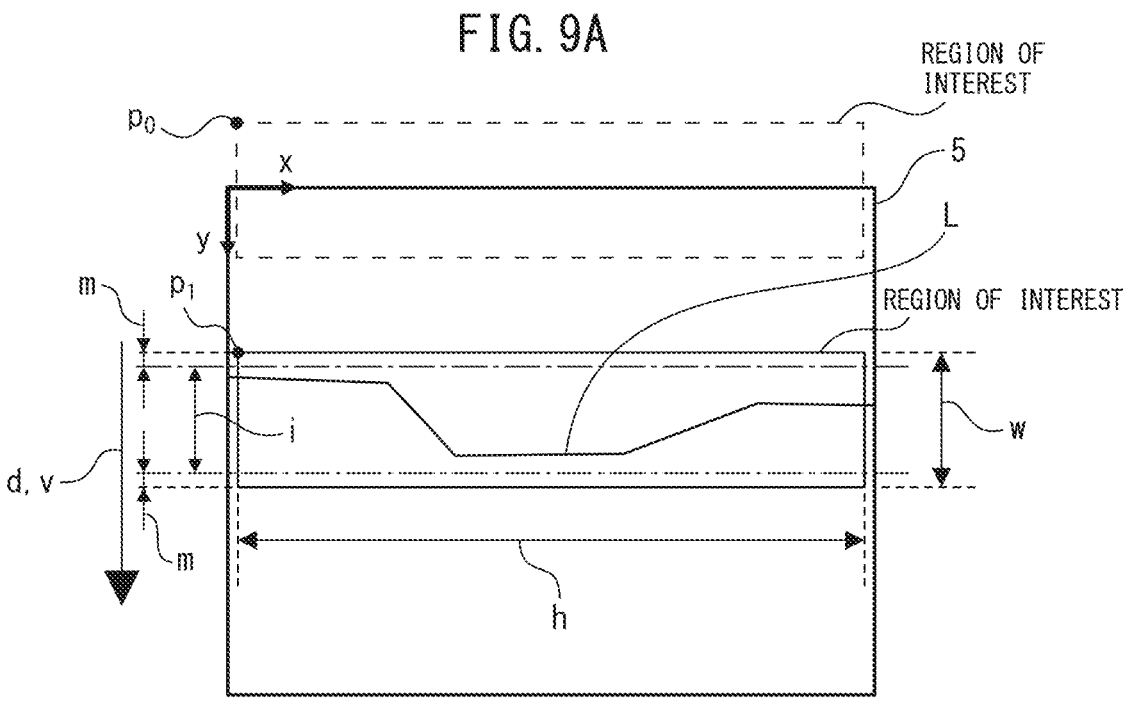
FIG. 9A is an image diagram showing an example of setting the region of interest.
FIG. 9B is an image diagram showing a modification of setting the region of interest.

FIG. 9A is an image diagram showing an example of setting the region of interest. The initial position $p_0$, the size (width w and height h), the movement direction d, and the movement speed v of the region of interest are set based on the design information of the three-dimensional measurement device 8. The design information of the three-dimensional measurement device 8 includes, for example, the arrangements of the light projection unit 7 and the light reception unit 3 (e.g., their respective positions and orientations), the distance-measurement range, the scanning direction of the reference light L, the scanning speed of the reference light L, the projection angle range of the light L, and the clock frequency of the image sensor, etc.

The region-of-interest setting unit 16 first obtains the imaging range i of the reference light L when setting the region of interest. The region-of-interest setting unit 16 may input the design information of the three-dimensional measurement device 8 (arrangements of the light projection unit 7 and the light reception unit 3 (their respective positions and postures), and the distance-measurement range, etc.) via a user interface unit such as a touch panel display or a mouse (not shown) and geometrically calculate the imaging range i of the reference light L based on the design information. Alternatively, the region-of-interest setting unit 16 may have a function of scanning the reference light L and calculating the imaging range i of the reference light L. In the latter case, for example, referring to FIG. 7B, a flat plate is arranged on the nearest side of the distance-measurement range, the reference light L is scanned, and the position and the time point of the imaging point (e.g., the pixel 11) where the reference light L is imaged are recorded. Also, a flat plate is arranged on the farthest side of the distance-measurement range, the reference light L is scanned, and the position and time point of the imaging point (e.g., the pixel 15) where the reference light L is imaged are recorded. The imaging range i of the reference light L corresponding to the distance-measurement range increases toward the end of the light reception surface 5 and is not constant throughout the scanning of the reference light L. Therefore, it is preferable that the region-of-interest setting unit 16 calculates the number of the pixels from the imaging point of the reference light L on the nearest side of the distance-measurement range (e.g., the pixel 11) to the imaging point of the reference light L on the farthest side of the distance-measurement range (e.g., the pixel 15) for each time point, and calculate the maximum value of the number of pixels over the entire distance-measurement range as the imaging range i of the reference light L.

The region-of-interest setting unit 16 sets the width w of the region of interest based on the imaging range i of the reference light L. The width w of the region of interest means the size of the region of interest in the scanning direction of the reference light L. The default value of the width w of the region of interest may be the imaging range i of the reference light L (e.g., the maximum number of pixels from the pixel 11 to the pixel 15 throughout the distance-measurement range) itself. Since the moving speed of the image of the reference light L formed on the light reception surface 5 is not constant even when the angular speed of the reference light L is constant, it is preferable to provide a margin to the width w of the region of interest. For example, the region-of-interest setting unit 16 may set a size obtained by adding a predetermined margin m to the imaging range i of the reference light L as the width w of the region of interest. The width margin m of the region of interest may be a predetermined constant.

The region-of-interest setting unit 16 sets the height h of the region of interest based on the size of the light reception surface 5. The height h of the region of interest means the size of the region of interest in the direction orthogonal to the scanning direction of the reference light L. The default value of the height h of the region of interest may be the number of pixels on the light reception surface 5 in the direction orthogonal to the scanning direction of the reference light L. The height h of the region of interest may be designated and set by any numerical value equal to or less than the number of pixels on the light reception surface 5 in the direction orthogonal to the scanning direction of the reference light L via the user interface unit, etc. For example, when measuring the three-dimensional shape of the object imaged on a known region on the light reception surface 5, the height h of the region of interest can be limited only to the region where the object exists, thereby reducing the influence of noise.

The region-of-interest setting unit 16 sets the moving direction d of the region of interest, based on the scanning direction of the reference light L. The region-of-interest setting unit 16 may arbitrarily designate and set the moving direction d of the region of interest via the user interface unit, etc. Alternatively, the region-of-interest setting unit 16 may determine the scanning direction of the reference light L when executing the aforementioned function of scanning the reference light L and calculating the imaging range i of the reference light L, and may automatically set the scanning direction of the reference light L as the movement direction d of the region of interest. In the example of FIG. 9A, the reference light (slit light) is arranged so as to be imaged on the light reception surface 5 in the horizontal direction, and the movement direction d of the region of interest is set as the upward or downward direction. On the other hand, when the reference light (slit light) is arranged so as to be imaged on the light reception surface 5 in the vertical direction, the moving direction d of the region of interest is set as the left or right direction.

The region-of-interest setting unit 16 sets the initial position $p_0$ of the region of interest using coordinate values of an orthogonal coordinate system (e.g., a camera coordinate system (or an illustrated xy coordinate system)) fixed on the same plane as the light reception surface 5. For example, when the region of interest is rectangular, the initial position $p_0$ of the region of interest may be the coordinate value of the upper left corner of the rectangle. The region-of-interest setting unit 16 may automatically set the initial position $p_0$ of the region of interest based on the scanning direction of the reference light L (or the movement direction d of the region of interest) and the size (width and height) of the region of interest. In the example of FIG. 9A, the reference light L (slit light) is arranged so as to be imaged on the light reception surface 5 in the horizontal direction, and the reference light L scans in the upward or downward direction on the light reception surface 5. Therefore, it is preferable that the region-of-interest setting unit 16 automatically sets the position of the upper left corner of the region of interest as the initial position $p_0$ of the region of interest, wherein the center line of the region of interest is the lowest or highest pixel row of the light reception surface 5. Also, when the reference light L (slit light) is arranged so as to be imaged on the light reception surface 5 in the vertical direction, and the reference light L scans in the right or left direction on the light reception surface 5, it is preferable that the region-of-interest setting unit 16 sets the position of the upper left corner of the region of interest as the initial position $p_0$ of the region of interest, wherein the center line of the region of interest is the leftmost or rightmost pixel row of the light reception surface 5. Alternatively, the region-of-interest setting unit 16 may arbitrarily designate and set the initial position $p_0$ of the region of interest via the user interface unit, etc. For example, when the reference light L (slit light) is arranged so as to be imaged on the light reception surface 5 in the horizontal direction, when the reference light L scans on the light reception surface 5 in the downward direction, and when the three-dimensional shape of the object imaged in a known area of the light reception surface 5 is detected, it is preferable that the region-of-interest setting unit 16 automatically sets the position of the upper left corner of the region of interest as the initial position $p_0$ of the region of interest, wherein the center line of the region of interest is the highest pixel row of the area where the workpiece exists. By virtue of this, the scanning of the region of interest can be limited to the area where the object exists, and the influence of noise can be reduced.

The region-of-interest setting unit 16 sets the movement speed v of the region of interest based on the scanning speed $\omega$ of the reference light L. When moving the region of interest in synchronization with the clock signal of the image sensor, it is preferable that the region-of-interest setting unit 16 calculate, based on the movement speed v of the reference light L, how many clocks of the operation clocks of the image sensor correspond to the time length required for the reference light L to move on the light reception surface 5 by one pixel, and that the light reception unit 3 moves the region of interest by one pixel for each number of clocks required for the reference light L to move on the light reception surface 5 by one pixel. For example, the time length t required for the reference light L to scan the entire distance-measurement range corresponds to (the projection angle range)/(the scanning speed) (i.e., $t=\theta max/\omega$). Therefore, assuming that the number of pixels on the light reception surface 5 in the scanning direction is n, the time length $\Delta t$ required for the image of the reference light L to move on the light reception surface 5 by one pixel is approximately t/n ($\Delta t \approx t/n$). In other words, when the clock frequency of the image sensor is F, the number of clocks c required for the reference light L to move on the light reception surface 5 by one pixel is F/v ($c=F/v$). Then, the light reception unit 3 moves the region of interest by one pixel every clock number c necessary for the reference light L to move on the light reception surface 5 by one pixel. As such, by moving the region of interest in synchronization with the clock signal of the image sensor, it is possible to move the region of interest with a simpler configuration than when the light reception unit 3 inputs an external signal as a trigger signal.

The light reception unit 3 locates the region of interest having the set size (width w and height h) at the initial position $p_0$, based on the input signal (e.g., the trigger signal) from the light projection unit 7, and moves the region of interest at the movement speed v in the movement direction d. The region of interest moves over time from the initial position $p_0$ to the position $p_1$. The three-dimensional information calculation unit 10 calculates three-dimensional information of the object by triangulation on the basis of the information (the event information or the luminance image) of the light reception unit 3 in the region of interest. The three-dimensional information calculation unit 10 can reduce the influence of noise caused by the multiple-reflected reference light, etc., by performing the distance-measurement while excluding information of the light reception unit 3 outside the region of interest.

FIG. 9B is an image diagram showing a modification of setting of the region of interest. When the light projection unit 7 projects a plurality of reference lights L1 and L2 while maintaining a predetermined projection angle interval, it is preferable that the region-of-interest setting unit 16 separately sets the initial positions $p_{1\,0}$ and $p_{2\,0}$ of the plurality of regions of interest 1 and 2 based on the projection angle interval. The settings other than the initial positions $p_{1\,0}$ and $p_{2\,0}$ of the plurality of regions of interest 1 and 2 (such as the size (width w and height h), the moving direction d, and moving speed v) may be the same as each other. The light-reception unit 3 inputs the input signal (e.g., the trigger signal) from the light projection unit 7 when the projection angles of the reference lights L1 and L2 reach respective predetermined angles, locates the regions of interest 1 and 2 each having the set size (width w and height h) at the initial positions $p_{1\,0}$ and $p_{2\,0}$, respectively, and moves the regions in the movement direction d at the movement speed v. Then, the light reception unit 3, although not limited thereto, outputs only logical product (AND) area information (the event information or the luminance image) between the region of interest and the section for which the scanning time extent of the reference light described in the first embodiment is set. The three-dimensional information calculation unit 9 calculates the three-dimensional information of the object by triangulation on the basis of the information.

In addition, although not shown, the region-of-interest setting unit 16 may have a function to setting a supplier-side region of interest set by a supplier of the three-dimensional measurement device 8 and a user-side region of interest set by a user of the three-dimensional measurement device 8. The region-of-interest setting unit 16 is designated and sets the supplier-side region of interest and the user-side region of interest via the user interface unit, etc. In this case, the region-of-interest setting unit 16 may set a logical product (AND) region of the supplier-side region of interest and the user-side region of interest as the region of interest, in addition to the section for which the scanning time extent of the reference light is set.

According to the three-dimensional measurement device 8 of the second embodiment, the distance-measurement is performed while excluding the information of the light reception unit 3 outside the region of interest, thereby the influence of noise caused by multiple-reflected reference light, etc., can be reduced. In addition, since the light reception unit 3 (i.e., the image sensor) outputs the information (the event information or the luminance information) in the region of interest only, in comparison to the case where the information output from the image sensor is limited only by the scanning time extent of the reference light, the deterioration of the processing time of the image sensor due to excessive noise is reduced. In particular, the event-based image sensor outputs only event information, so it has low latency in the first place, but by outputting the event information in the region of interest only, the latency (delay time) of the image sensor due to too many events can be reduced, and the benefits of the event-based image sensor can be obtained or maintained.

The programs executed by the processor and/or the integrated circuit described above may be recorded and provided on a computer-readable non-transitory recording medium such as a CD-ROM, or may be distributed and provided wired or wirelessly from a server device on a WAN (wide area network) or LAN (local area network).

Although the various embodiments are described herein, it should be noted that the present invention is not limited to the above embodiments, and various modifications can be made within the scope of the claims.

REFERENCE SIGNS LIST 1 stereo camera
2 left light reception unit
3 right light reception unit (light reception unit)
4 left light reception surface
5 right light reception surface (light reception surface)
6 light section system
7 light projection unit
8 three-dimensional measurement device
9 three-dimensional information calculation unit
10 time extent setting unit
11 pixel
12 projection angle interval setting unit
13 external equipment
14 region-of-interest movement unit
B base line length
D disparity
f focal length
I image of reference light
L reference light
P point of object
Q imaging point on the nearest side of the distance-measurement range
R imaging point on the farthest side of the distance-measurement range
QR intersection line of view line of pixel and distance-measurement range
S surface of object
V view line
W object
Z distance to point P of object
$\theta$ projection angle
$\theta$max projection angle range
$\varphi$ scanning angle
$\omega$ scanning speed
imaging range of reference light
$p_0$, $p_{1\ 0}$, $p_{2\ 0}$ initial position of region of interest
w width of region of interest
m margin of width of region of interest
h height of region of interest d movement direction of region of interest
v movement speed of region of interest
F clock frequency of image sensor

The invention claimed is:

1. A three-dimensional measurement device, comprising:
a projection unit configured to project a reference light to an object while scanning the object with the reference light;
a light reception unit configured to receive the reference light reflected by the object;
a time extent setting unit configured to
define a plurality of predetermined sections along a scan, each section of the plurality of predetermined sections including at least one pixel of a plurality of pixels of the light reception unit, and
for each of the plurality of predetermined sections, set a scanning time extent of the reference light between a first time point when the reference light is irradiated onto a first point on a farthest side of a distance-measurement range relative to the light reception unit and a second time point when the reference light is irradiated onto a second point on a nearest side of the distance-measurement range relative to the light reception unit; and
a three-dimensional information calculation unit configured to calculate three-dimensional information of the object by means of triangulation using information of the light reception unit only in the set scanning time extent,
wherein
the light reception unit is configured to
monitor an event for each of the pixels, and
output at least a position, a time point and a polarity of the pixel where the event occurred, as the information of the light reception unit, and
the three-dimensional information calculation unit is configured to calculate a distance from the three-dimensional measurement device to the object by using the position, the time point and the polarity of the pixel where the event occurred, within the set scanning time extent of the reference light between the first time point and the second time point.

2. The three-dimensional measurement device according to claim 1, wherein the projection unit is configured to project a plurality of the reference light while maintaining a predetermined projection angle interval.

3. The three-dimensional measurement device according to claim 1, wherein the scanning time extent is a time extent in which the reference light scans an intersection line of a line of vision of each pixel of the plurality of pixels of the light reception unit and the distance-measurement range.

4. The three-dimensional measurement device according to claim 1, wherein the scanning time extent is set for each pixel with one pixel of the light reception unit as one section, or set for each section with a group of pixels in the vicinity of the light reception unit as one section.

5. The three-dimensional measurement device according to claim 2, further comprising a projection angle interval setting unit, wherein
the projection unit is configured to project a plurality of slit lights as the plurality of the reference lights, and
the projection angle interval setting unit is configured to set the projection angle interval according to the set scanning time extent to be wider than a scanning angle at which a slit light of the plurality of slit lights scans in the set scanning time extent.

6. The three-dimensional measurement device according to claim 1, wherein the light reception unit is configured to output only the information of the light reception unit in a region of interest among the plurality of pixels, and the region of interest moves over time so as to include a section of the plurality of pixels for which the scanning time extent including a certain time during measurement is set.

7. The three-dimensional measurement device according to claim 1, wherein the light reception unit is configured to output only the information of the light reception unit in a region of interest among the plurality of pixels, and the region of interest moves over time so as to include an imaging range of the reference light corresponding to the distance-measurement range at a certain time point during measurement.

8. The three-dimensional measurement device according to claim 1, wherein the three-dimensional information calculation unit is configured to calculate the distance from a base line defined by a light projection start point of the projection unit and a focal point of the light reception unit to the object by using the position, the time point and the polarity of the pixel where the event occurred, within the set scanning time extent of the reference light between the first time point and the second time point.

* * * * *